United States Patent [19]

Watanabe et al.

[11] Patent Number: 5,101,440

[45] Date of Patent: Mar. 31, 1992

[54] PICTURE PROCESSING APPARATUS

[75] Inventors: Toshiro Watanabe; Toshiyuki Hiroi, both of Kanagawa, Japan

[73] Assignee: Sony Corporation, Tokyo, Japan

[21] Appl. No.: 404,699

[22] Filed: Sep. 8, 1989

[30] Foreign Application Priority Data

Sep. 8, 1988 [JP] Japan .................................. 63-225323
Mar. 6, 1989 [JP] Japan .................................... 1-52150

[51] Int. Cl.$^5$ .............................................. G06K 9/48
[52] U.S. Cl. ...................................... 382/22; 340/747; 358/81
[58] Field of Search ................... 382/22; 340/703, 744, 340/747; 358/81, 82; 364/518, 521

[56] References Cited

U.S. PATENT DOCUMENTS

| 4,677,574 | 6/1987 | Kausch | 340/747 |
| 4,691,366 | 9/1987 | Fenster et al. | 382/22 |
| 4,736,515 | 4/1988 | Ozaki et al. | 364/518 |
| 4,862,388 | 8/1989 | Bunker | 340/747 |

Primary Examiner—Michael Razavi
Attorney, Agent, or Firm—Lewis H. Eslinger; Jay H. Maioli

[57] ABSTRACT

A picture processing apparatus in which edges of an input picture are detected by an edge detecting circuit to form edge detection data, which then are transformed so that a histogram of the edge detection data becomes substantially flat, and in which a so-called line picture is displayed on the basis of the transformed edge detection data.

8 Claims, 13 Drawing Sheets

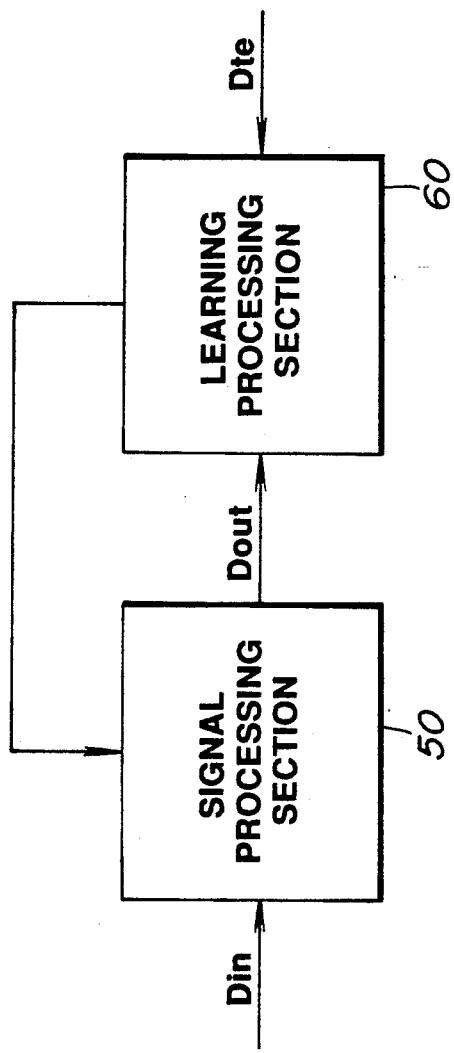
FIG. 24
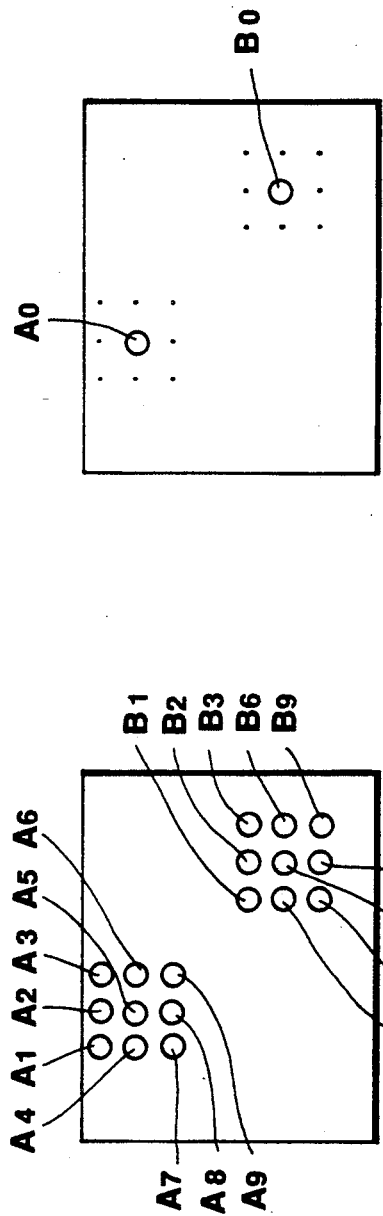
FIG. 26A
FIG. 26B

PICTURE PROCESSING APPARATUS

BACKGROUND OF THE INVENTION

1. Field of the Invention

This invention relates to a picture processing apparatus for transforming an input picture into a picture of a desired morphological state. More particularly, it relates to a picture processing apparatus for transforming an input picture into a picture in which the edge portions of the picture are expressed as lines, referred to hereinafter as a line picture.

2. Description of the Prior Art

Most of the structural features contained in a picture output from a camera, VTR or the like may be grasped as lines characteristic of the edge portions, such as contours or boundaries, of the photographed object. The line picture in which the features of the original picture are grasped and expressed by lines give a strong impression to the viewer. On the other hand, a crayon picture or an oil painting, which is a picture colored by special techniques, imparts a unique feeling or sense of a piece of art. Conventionally, such line picture or picture colored by special techniques were prepared by manual operation, so that considerable time and labor were expended in preparing such pictures.

OBJECTS AND SUMMARY OF THE INVENTION

Objects

It is a principal object of the present invention to provide a picture processing apparatus whereby the line picture may be prepared automatically based on picture data representing a picture.

It is another object of the present invention to provide a picture processing apparatus whereby a colored line picture may be prepared automatically based on picture data representing a picture.

It is still another object of the present invention to provide a picture processing apparatus whereby the weighting coefficients are determined in advance following a short learning time, and the edges of the input picture, such is its contours or boundaries, are detected on the basis of the input picture data for transforming the input picture into the line picture.

Summary

For accomplishing the principal object of the present invention, the edges of the input picture are detected by edge detection means to produce edge detection data, the edge detection data are transformed so that the edge detection data present a substantially flat histogram, and a line picture is displayed on the basis of the transformed edge detection data.

For accomplishing the above-mentioned second object of the present invention, the edges of an input picture are detected by edge detection means to produce edge detection data, said edge detection data are transformed so that the edge detection data present a substantially flat histogram, color data corresponding to the colors of the input picture are added to the transformed edge detection data, and a line picture colored on the basis of the transformed and color-data added edge detection data is displayed.

For accomplishing the above-mentioned third object of the present invention, a picture processing apparatus comprises an input section and an intermediate section, each having a plurality of cells performing signal processing, and an output section having one cell, wherein the signals output from the cells of the input section are each multiplied by a weighting coefficient before being fed to the cells of the intermediate section and wherein the signals output from the cells of the intermediate section are each multiplied by a weighting coefficient before being fed to the cell of the output section, in a manner such that the input picture data to the input section representing the input picture are transformed into line picture data representing a line picture. The output picture data outputted from the output section when picture data representative of a partial picture representing a given small area of an input picture are entered in advance to the input section are compared with line picture data representing a desired line picture, and the weighting coefficients corresponding respectively to the above mentioned cells are determined on the basis of the results of comparison.

BRIEF DESCRIPTION OF THE DRAWINGS

FIGS. 6 to 9 are diagrammatic views for illustrating the operation of edge detection by edge detection means provided in the picture processing apparatus shown in FIG. 1.

FIGS. 24 and 25 are block diagrams showing still another embodiment of the picture processing apparatus of the present invention in which weighting coefficients are set by learning.

FIG. 26A is a diagrammatic view for illustrating the input picture data to be used for learning that are fed to the picture processing apparatus shown in FIGS. 24 and 25.

FIG. 26B is a diagrammatic view for illustrating teacher signals to be used for learning that are fed to the picture processing apparatus shown in FIGS. 24 and 25.

DETAILED DESCRIPTION OF THE PREFERRED EMBODIMENTS

Figure 1:
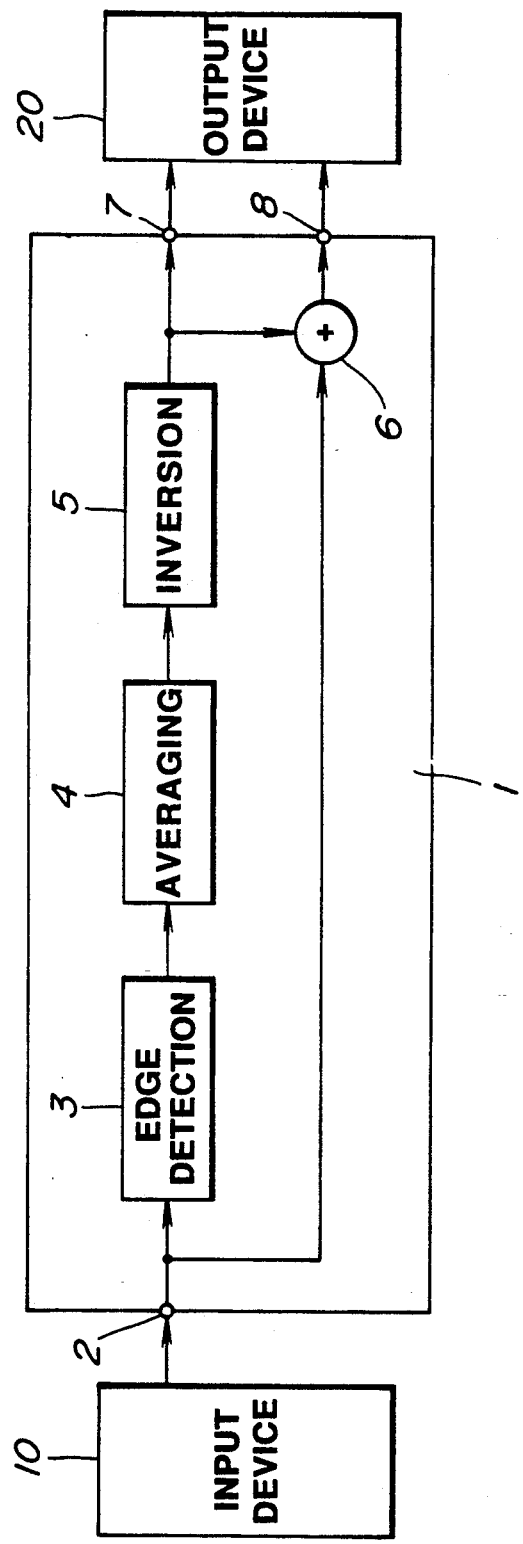
FIG. 1 is a block diagram showing an embodiment of a picture processing apparatus of the present invention.

The present invention will be explained in more detail hereinbelow by referring to the drawings.

FIG. 1 is a block diagram showing the arrangement of a picture processing apparatus 1 according to a first embodiment of the present invention. The picture processing apparatus 1 is comprised of a microprocessor and adapted to perform picture data processing indicated by each virtual circuit block in accordance with the program that was previously written in a memory, not shown.

The picture data processing apparatus 1 has an input terminal 2 for picture data, connected to an input device 10, and output terminals 7, 8, connected to an output device 20. A series circuit composed of an edge detection circuit 3, an averaging circuit 4 and an inversion circuit 5 is provided between the input terminal 2 and the output terminal 7. The input terminal 2 and the output of the inversion circuit 5 are connected via a summing circuit 6 to the other output terminal 8.

The input device 10 may be a device whereby analog picture signals of an object photographed by, for example, a video camera device or an electronic still camera device, or analog picture signals reproduced by a video tape recorder (VTR) or a still image filing system, may be converted into digital output data in accordance with the level of the three prime colors of R, G and B, or a device for producing digital data from digital video camera devices or digital VTRs.

The output device 20 connected to the output terminals 7, 8 may be a VTR for recording picture data produced by the picture data processing apparatus 1, a display device or a printer for reproducing the picture data.

Figure 2:
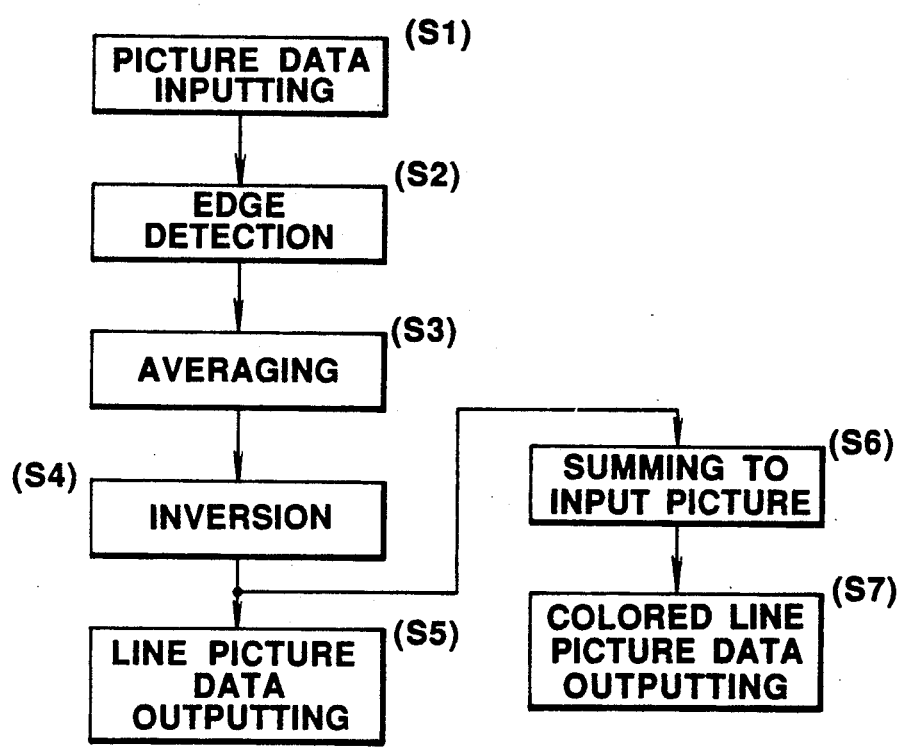
FIG. 2 is a flowchart for illustrating the operation of the picture processing apparatus shown in FIG. 1.
Figure 3:
FIGS. 3 to 5 are diagrammatic views for illustrating the operation of the picture processing apparatus shown in FIG. 1.
Figure 4:
Figure 5:

The sequence of picture data processing by the picture data processing apparatus 1 is explained more specifically by referring to the schematic diagrams of FIGS. 3 to 5 and to the flowchart of FIG. 2.

When an input picture data, which for example is a view of a person from the back, as shown in FIG. 3, are entered at step S1 from the input device 10, the data processing apparatus 1 performs the following edge detecting operation at step S2 by the edge detecting circuit 3.

That is to say, the levels of the three prime colors R, G and B of the edge portions of the picture shown in FIG. 3, such as the contour of the person, boundary lines or creases etc. of his clothing, differ markedly from those in the near-by regions. The edge detecting circuit 3 for performing such edge detection operates to detect the discontinuity in the values of the input picture data supplied from the input device 10 and to produce edge detection data in accordance with the detected discontinuity so that the data are larger in magnitude for bold edge lines, such as contours of the person, and are smaller in magnitude for finer edge lines, such as creases of the person's clothing, appearing as lines against a uniform background. In this manner, there are obtained from the edge detecting circuit 3 edge detection data that provide a picture in which the edge portions each represent gradation, in accordance with the magnitude of the data values, as indicated by the solid and broken lines in FIG. 4, and the remaining portions become uniform.

Figures 6, 7, 8, 9:
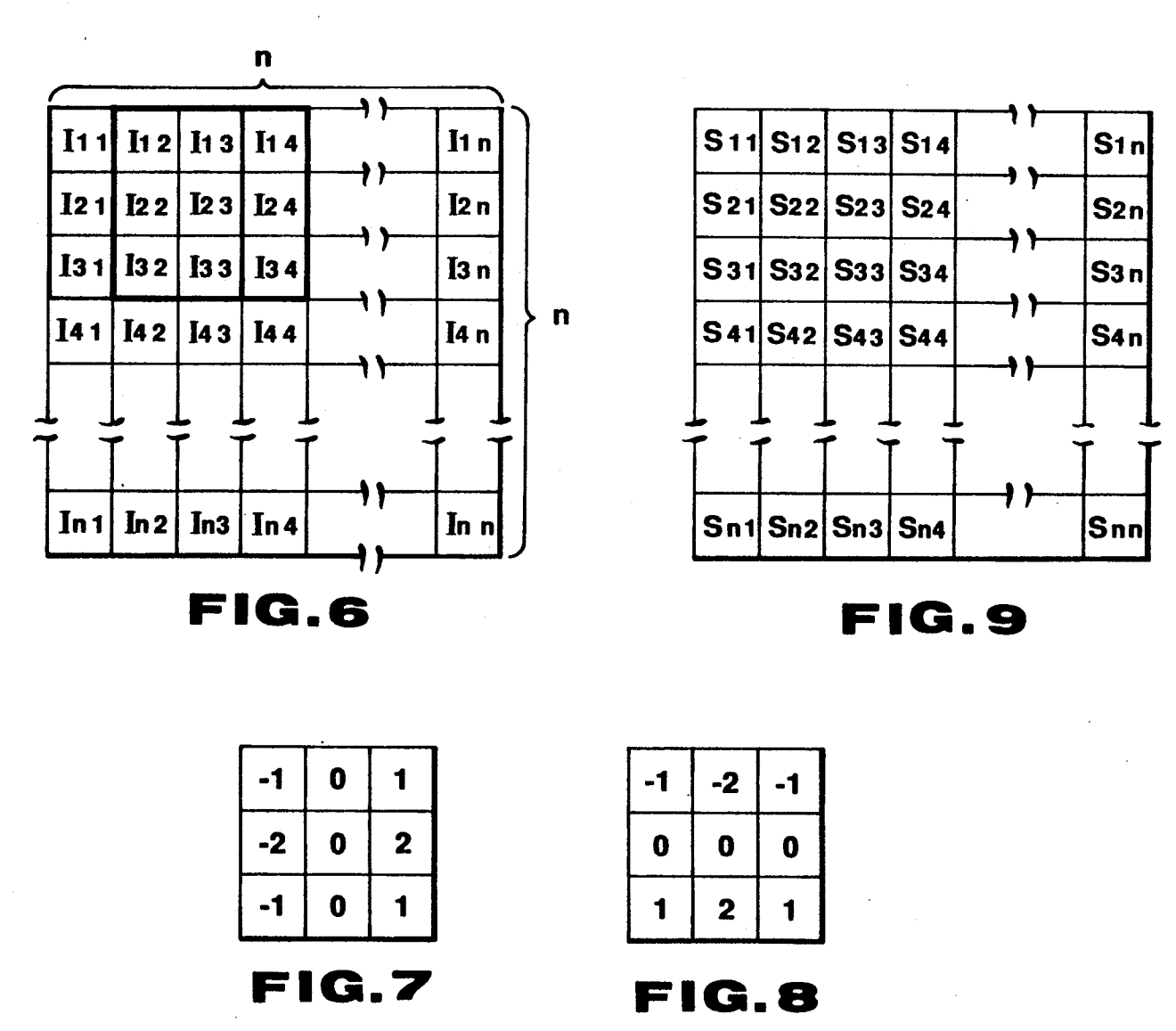

The principle of edge detection by edge detection circuit 3 is hereinafter explained. It is assumed that, as shown in FIG. 6, the number of pixels of video signals from a VTR or a camera is equal to n x n. The vertical components of an edge are first detected. A set of 3×3 pixels, such as $I_{11}, I_{12}, I_{13}, I_{21}, I_{22}, I_{23}, I_{31}, I_{32}$ and $I_{33}$, are taken of the totality of the pixels making up the picture signals. The brilliance data of the pixels are multiplied by corresponding coefficients of a template shown in FIG. 7, and the products are summed together, as shown in the formula (1), to find the vertical component B of the edge:

$$B = (-1) \times I_{11} + (0) \times I_{12} + (1) \times I_{13} + (-2) \times I_{21} + \quad (1)$$
$$(0) \times I_{22} + (2) \times I_{23} + (-1) \times I_{31} + (0) \times I_{32} + (1) \times I_{33}$$

Meanwhile, the coefficients of the template are symmetrical in magnitude and opposite in polarity, when viewed in the left and right direction, so that, when there is no change in the brightness level in the horizontal direction, the value of B in the formula (1) becomes zero. However, when there is a change in the brightness level in the horizontal direction, the value of B in the formula (1) does not become zero. The horizontal component of the edge is then detected. To this end, a set of 3×3 pixels is taken of the totality of the pixels making up the picture signals, as in the case of detection of the vertical component of the edge. The brightness data of the pixels are then multiplied by the corresponding coefficients of the template shown in FIG. 8, as shown in the formula (2), and the products are summed together, to find the horizontal component C of the edge:

$$C = (-1) \times I_{11} + (-2) \times I_{12} + (-1) \times I_{13} + (0) \times I_{21} + \quad (2)$$
$$(0) \times I_{22} + (0) \times I_{23} + (1) \times I_{31} + (2) \times I_{32} + (1) \times I_{33}$$

Meanwhile, the coefficients of the template are symmetrical in magnitude and opposite in polarity when viewed in the up and down direction, so that, when there is no change in the brightness level in the vertical direction, the value of B in the formula (2) becomes zero. However, when there is a change in the brightness level in the vertical direction, the value of B in the formula (2) does not become zero. From the vertical component B and the horizontal component C of the edge, found by the formulas (1) and (2), an edge detection data $S_{22}$:

$$S_{22} = \sqrt{B^2 + C^2} \quad (3)$$

is found, which data $S_{22}$ represents the strength of the edge at the center one of 3×3 pixels, as shown in FIG.

Figure 10:
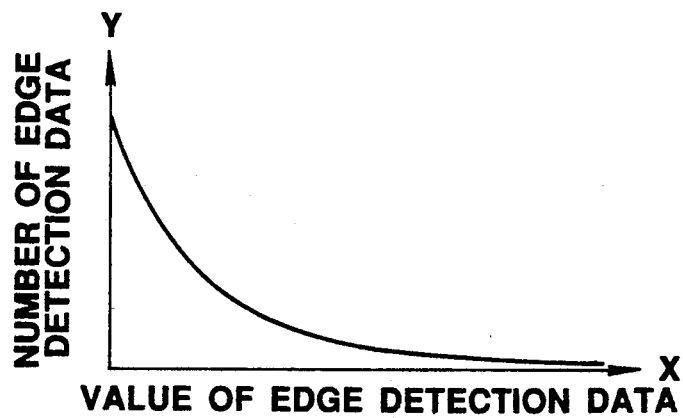
FIG. 10 is a chart showing the histogram of edge detection data output from edge detection means provided in the picture processing apparatus shown in FIG. 1.

9. This edge detection data $S_{22}$ is outputted from the edge detection means 3 as the edge detection data corresponding to the center pixel of the set of 3×3 pixels. Then, as shown in FIG. 6, the set of 3×3 pixels is shifted rightward by a pitch equivalent to one pixel to find an edge data $S_{23}$ representing the edge strength at the center pixel of a set of 3×3 pixels of $I_{12}$, $I_{13}$, $I_{14}$, $I_{22}$, $I_{23}$, $I_{24}$, $I_{32}$, $I_{33}$ and $I_{34}$, in the similar manner as explained hereinabove. By shifting the set of 3×3 pixels rightward in this manner gradually by a pitch equivalent to one pixel, each time, it becomes possible to detect all of the edges in the picture signals. These edge detection data are output at edge detecting circuit 3. In FIG. 10, the frequency of occurrence or histogram of the edge detection data is plotted against the values of the thus found edge detection data.

In general, the edge detection data obtained in this manner mostly represent extremely fine edge portions, that is, they are of lesser magnitude, such that the frequency of occurrence of the respective values or histogram presents a curve similar to a curve indicated by the formula (4)

$$Y = \frac{1}{X} \quad (4)$$

where Y and X stand for the number and the magnitude of the edge detection data.

The picture data processing apparatus 1 then functions at step S3 to average out the gradation of the edge portions of the edge detection data from the edge detection means 3, by the averaging means 4, for producing the picture data of the picture shown in FIG. 5.

Figure 11:
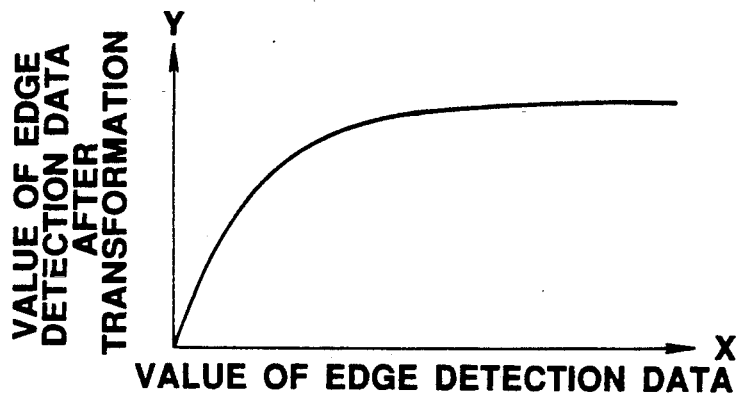
FIG. 11 is a chart showing an example of a transform function employed in the averaging means provided in the picture processing apparatus shown in FIG. 1.
Figure 12:
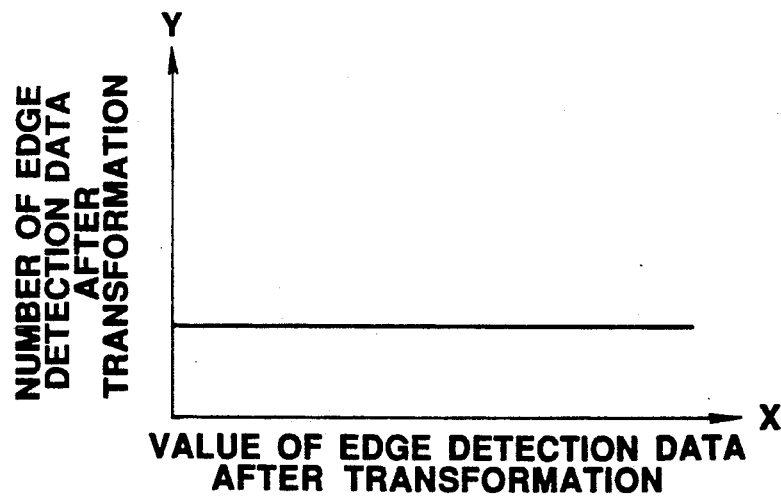
FIG. 12 is a chart showing the histogram of edge detection data after transformation by the averaging means provided in the picture processing apparatus shown in FIG. 1.

The averaging circuit 4, performing this averaging operation, performs transformation of the edge detection data outputted from the edge detection circuit 3, such that the above mentioned histogram will be substantially uniform (hereinafter referred to as histogram transformation). Expressed differently, as shown in FIG. 10, the histogram of the edge detection data is expressed by a curve similar to one shown by the formula (5)

$$Y = \frac{1}{X} \quad (5)$$

so that, by transforming the values of the edge detection data by a function which is an integration of the above curve with respect to X (the values of the edge detection data), that is, a function which is shown by a chart of FIG. 11 and which is similar to a curve shown by the formula (6)

$$Y = log(X) \quad (6)$$

wherein Y stands for the magnitude of the data after transformation and X the magnitude of the edge detection data, the above mentioned histogram becomes substantially uniform, as shown in FIG. 12.

In the picture data processing apparatus 1, the edge detection data are averaged out in this manner to emphasize the edge portions of the edge detection data. Therefore, the finer edge portions shown by the broken lines in FIG. 4 are emphasized to a level approximate to more well-defined edge portions shown by the solid lines in FIG. 4, so that the picture data may be produced from the averaging means 4, in which the finer edge portions, such as creases in the clothing, are changed to well-defined lines, and thus the edge portions, which should be continuous lines, are expressed as lines devoid of interruptions.

Figure 13:
FIG. 13 is a diagrammatic view showing an example of a line picture when averaging is not performed by the averaging means provided in the picture processing apparatus shown in FIG. 1.

FIG. 13 shows a picture which should be obtained when the picture data of the output picture from the edge detection circuit 3 as shown in FIG. 4 has not been averaged out in the manner as explained hereinabove. On comparing the picture shown in FIG. 13 with that shown in FIG. 5, it may be seen that, in the picture which has undergone the averaging operation shown in FIG. 5, fine lines of the original picture shown in FIG. 3 are represented more satisfactorily as well-defined lines.

The picture data processing apparatus 1 then functions step. S4 to perform at the inverting circuit 5 a data inversion or transformation of the output data from the averaging means 4 in which the edge portions are indicated in black color and the remaining portions are indicated in white color, for example, by way of a negative-positive inversion, to form line picture data, and to output these line picture data at step S5 at the output terminal 7. Similar line picture data may also be obtained when the input picture data supplied from the input device 10 are first subjected at step S4 to data transformation by the inverting circuit 5, followed by edge detection at step S2 and averaging at step S3, in this sequence.

The picture data processing apparatus 1 then functions to combine the picture represented by the line picture data output from the inverting means 5 with the picture represented by the input picture data, at the summing circuit 6, according to an arbitrarily selected mixing ratio, to produce colored line picture data, and to output these colored line picture data at the output terminal 8 at step S7. The picture data processing apparatus 1 may be so designed and arranged as to change the degree of picture coloration by changing the value of the mixing ratio of the two pictures to form picture data for pictures having variegated feelings or tones.

Meanwhile, in the picture data processing apparatus 1, means may be preferably provided between the edge detection circuit 3 and the averaging circuit 4 for processing the edge detection data formed at the edge detection circuit 3 and having values larger than the prescribed values so as to have a prescribed value before the data are supplied to the averaging circuit 4. By providing such processing circuit, it becomes possible to reduce the difference among the values of the edge detection data in advance and hence to express the fine edge portions more satisfactorily.

By performing the picture data processing operation, as explained hereinabove, the picture data processing apparatus 1 is in a position to form data of a line picture in which characteristics of the picture represented by the input picture data are grasped more satisfactorily. Therefore, with the use of the picture data processing apparatus 1, line pictures may be formed with substantially less labor and time than those expended in prenous manual operations. In addition, with the use of a high-speed microprocessor or dedicated hardware, input picture data may be converted into the line picture data on substantially a real time basis, so that animated pictures may be produced easily.

Although the picture data processing device 1 is described hereinabove as handling picture data separated into three prime colors of R, G and B, the above described picture data processing may also be applied to picture data in the form of digitized brightness signals.

Figure 14:
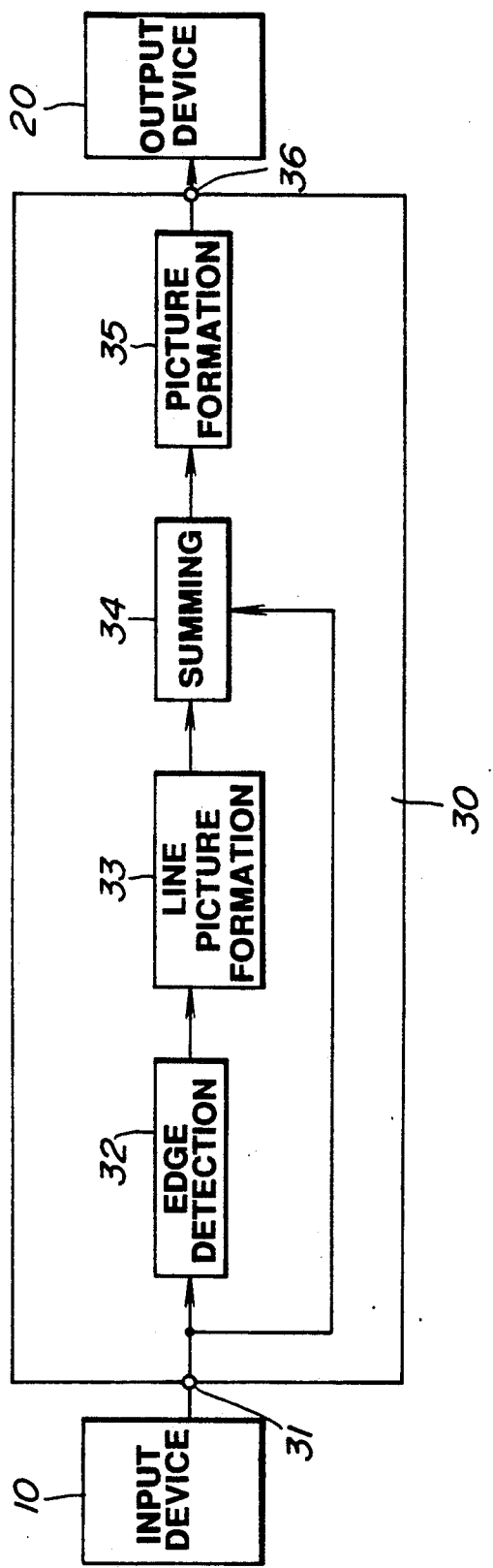
FIG. 14 is a block diagram showing another embodiment of the picture processing apparatus of the present invention.

FIG. 14 is a block diagram showing an arrangement of a second embodiment of a picture processing apparatus according to the present invention. The picture processing apparatus 30 is comprised kf a microprocessor, and formed by edge detection circuit 32, line picture forming circuit 33, summing circuit 34 and picture forming or picturizing circuit 35.

Of these, the edge detection circuit 32 and the summing circuit 34 are similar to the edge detection circuit 3 and the summing circuit 6 of the picture data processing apparatus 1, respectively. The line picture forming circuit 33 is formed by the averaging circuit 4 and the inverting circuit 5 of the picture data processing apparatus 1 combined together. An input device 10, connected to the edge detecting circuit 32 via input terminal 31, and an output device, 20, connected to the picture forming circuit 35 via output terminal 36, are similar to the input and output devices of the preceding first embodiment.

Figure 15:
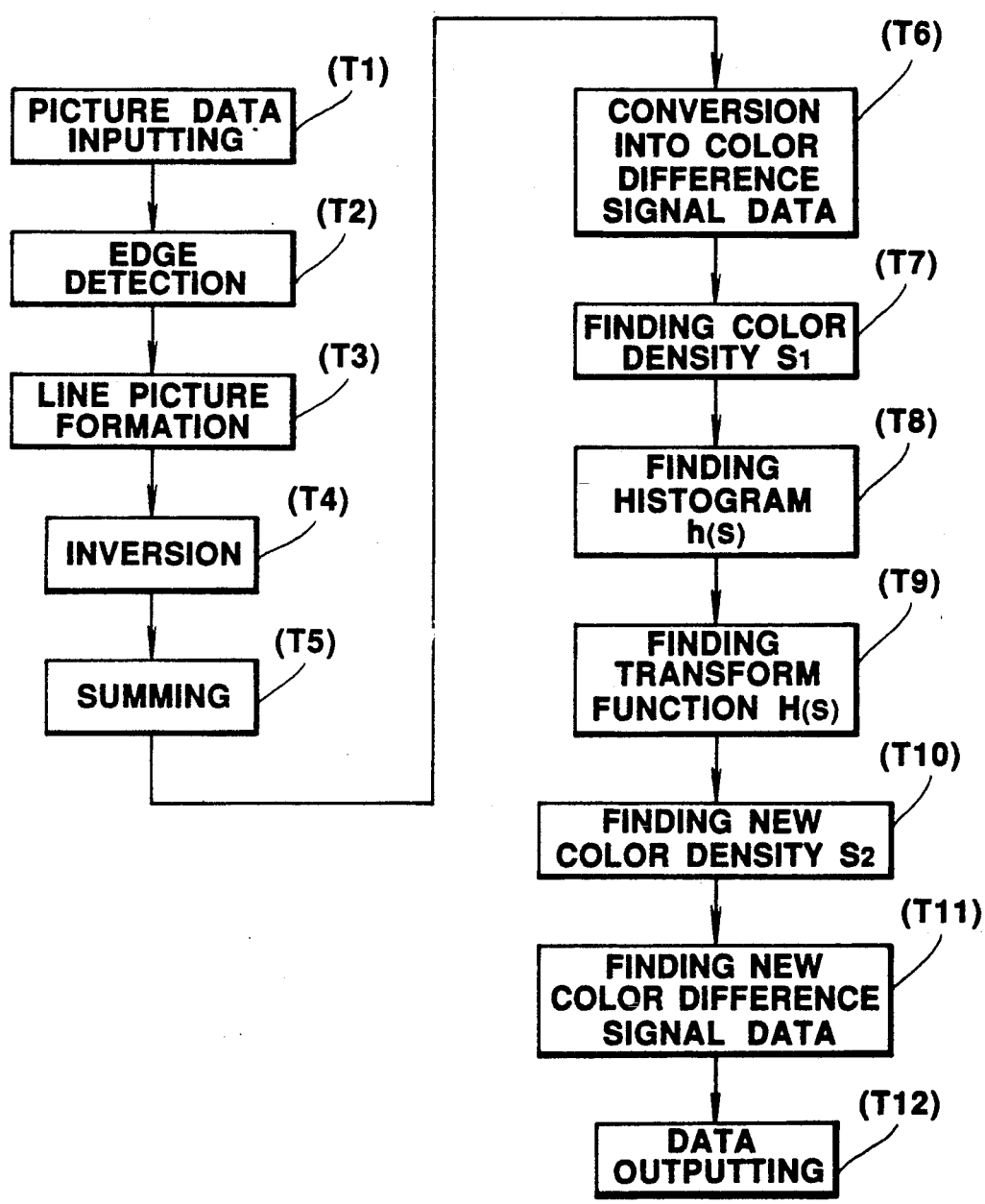
FIG. 15 is a flowchart for illustrating the operation of the picture processing apparatus show in FIG. 14.

FIG. 15 shows a flowchart illustrating data processing by the picture data processing apparatus 30.

Figure 16:
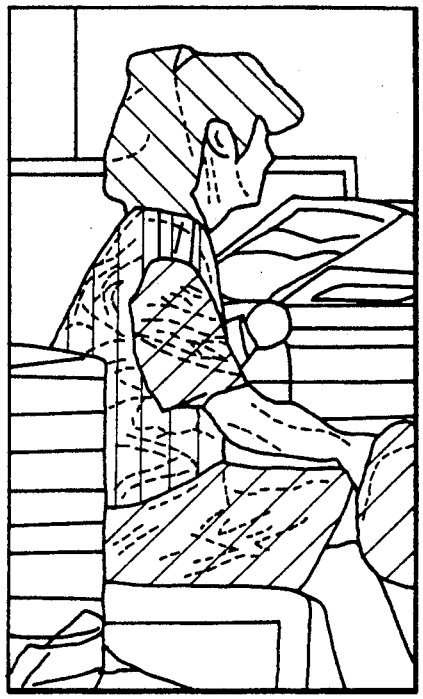
FIGS. 16 to 19 are diagrammatic views for illustrating the operation of the picture processing apparatus shown in FIG. 14.

When input color picture data of a person sitting on a chair as shown for example in FIG. 16 are supplied at step T1 to the picture processing apparatus 30, from the input device 10, these input color data are supplied to edge detection circuit 32 and summing circuit 34.

The picture data processing apparatus 30 functions similarly to the first embodiment in such a manner as to detect discontinuity in the value of the input picture data by the edge detection circuit 32 at step T2 to detect edge portions of the picture represented by input picture data.

Meanwhile, histogram transformation of the brightness signals may be performed before step T2 to reduce the adverse effects caused by noise components.

The picture data processing apparatus 30 then proceeds to step T3 where the line picture forming circuit 33 performs a data conversion or transformation to reduce the difference among the data of the edge portions obtained at the edge detection circuit 32 to emphasize the fine edge portions to a level close to more well-defined edge portions for averaging the gradation of the edge portions. In this manner, the data of a line picture may be formed, in which features of lines of the picture represented by the input picture data have been grasped satisfactorily. As such data conversion or transformation, the above described histogram transformation or logarithmic transformation may be employed.

Figure 17:
Figure 18:
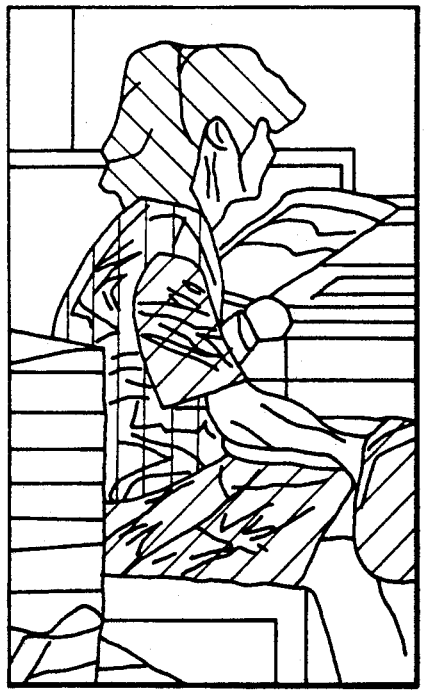

The picture data processing apparatus 30 then proceeds to step T4 where the data of a line picture are subjected to a negative-positive inverting operation by line picture forming circuit 33 to form data of the line picture in which the features of the line picture shown in FIG. 16 have been grasped satisfactorily, as shown in FIG. 17. The data formed in this line picture forming circuit 33 are sent to summing circuit 34.

Meanwhile, when there are obtained picture data in step T3 in which the edge portions are indicated in a black color and the remaining portions are indicated in a white color, it is unnecessary to carry out this step T4. Similar data may be obtained when the steps T2 and T3 are carried out after the input picture data are subjected to the data transformation of step T4.

The picture data processing apparatus 30 then proceeds to step T5 where the data of a picture combined from the picture represented by output data of the line picture forming circuit 33 and input picture data from the input device 10 are formed by the summing circuit 34. The data formed by the summing circuit 34 represent the data of the line picture of FIG. 17 colored after the picture shown by the input picture data shown in FIG. 16. This picture is comparable to a line picture colored for example with a colored pencil.

The picture data processing apparatus 30 then proceeds to steps T6 to T11 where the color density or concentration of the picture indicated by data produced by the summing circuit 34 is averaged out by the picturizing circuit 35.

In the step T6, the output data of the summing circuit 34 are converted into two color-difference signals (R-Y) and (B-Y).

In the next step T7, the color concentration $S_1$, that is the data indicative of the color density, is found by the formula (7)

$$S_1 = \sqrt{(BY_1)^2 + (RY_1)^2} \qquad (7)$$

from the values of the color-difference signal data $(BY_1)$, $(RY_1)$. For simplifying the computation, the color concentration $S_1$ may also be found by the formula (8)

$$S_1| (BY_1)|+|(RY_1)| \qquad (8)$$

In the next step T8, the frequency of occurrence on histogram h(s) of each value of the color concentration $S_1$ is found for the picture as a whole.

In the next step T9, a transform function H(s) is found, in which the histogram h(s) is integrated with respect to the color concentration $S_1$.

Although the transform function H(s) has been found by the steps T6 to T9, the transform function may also be substituted by a suitable function, such as a longarithmic function, approximate to the transform function H(s).

In the next step T10, the color concentration $S_1$ is subjected to transformation by the transform function H(s) to find the new color concentration $S_2$ for each pixel.

The transform operation at step T10 may also be performed by a composite function G(H(s)) of the transform function H(s) with another function G(x). In this case, the color concentration may be changed arbitrarily by changing the function G(x).

In the next step T11, the values $(BY_1)$, $(RY_1)$ of the data of each color difference signal are transformed for each pixel by the formulas (9) and (10)

$$(BY_2)=(S_2/S_1)(BY_1) \qquad (9)$$

$$(RY_2)=(S_2/S_1)(RY_1) \qquad (10)$$

to find the values of data of new color-difference signals $(BY_2)$ and $(RY_2)$.

Figure 19:
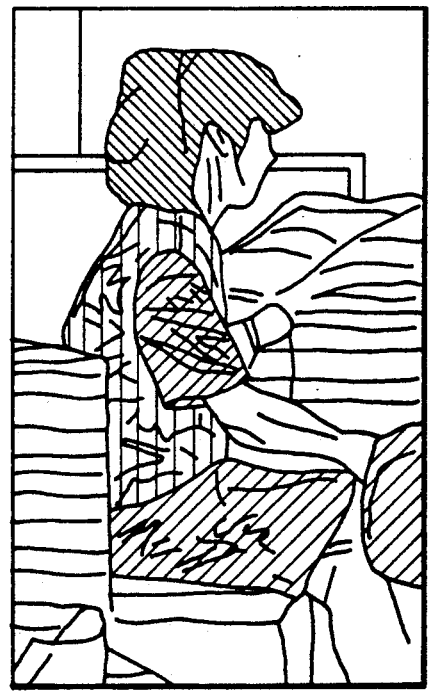

The data formed in this manner are transformed so that the color concentration $S_1$ is averaged out for the whole picture and hence picture data of bright color like those of a crayon picture or an oil painting, such as the picture shown in FIG. 19, are produced.

Finally, the picture data processing apparatus 30 proceeds to step T12 to output the bright-color picture data from the picturizing circuit 35 via output terminal 36 to the output device 20.

By forming the data of the bright-color picture data with the use of the picture data processing apparatus 30 in this manner, still or animated pictures may be formed with time and labor markedly less than in the case of the manual operation.

Figure 20:
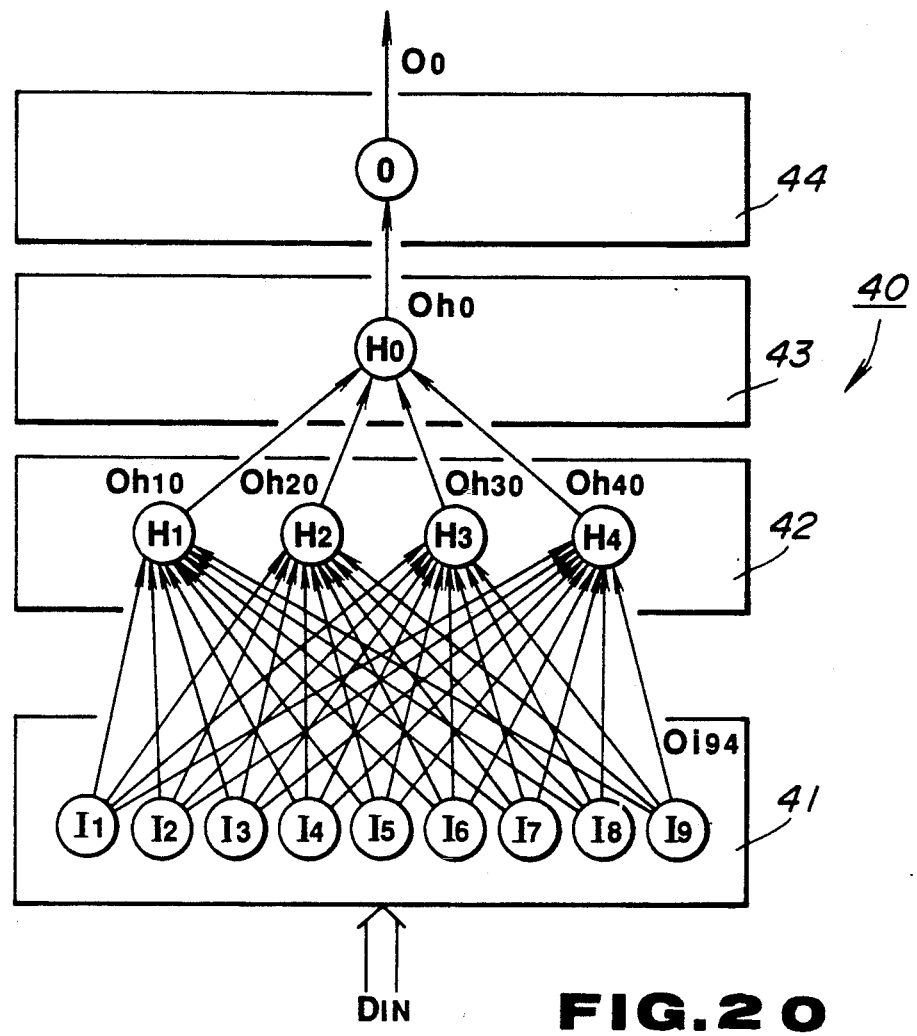
FIG. 20 is a block diagram showing still another embodiment of the picture processing apparatus of the present invention.

In the third embodiment of the picture processing apparatus shown in FIG. 20, the picture data processing apparatus of the present invention is constituted by a so-called neural network 40.

This picture data processing apparatus is constituted by a four-layer neural network 40 comprised of an inlet layer 41, a first intermediate layer 42, a second intermediate layer 43 and an output layer 44.

Figure 21:
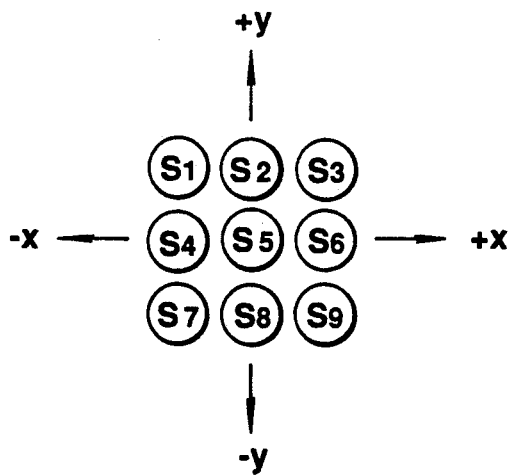
FIG. 21 is a diagrammatic view for illustrating the status of the input picture data fed to the apparatus shown in FIG. 20.

The input layer 41 is constituted by nine cells $I_1$, $I_2$, $I_3$, $I_4$, $I_5$, $I_6$, $I_7$, $I_8$ and $I_9$ to which input picture data $D_{IN}$ comprised of a 3×3 array of pixels $S_1$, $S_2$, $S_3$, $S_4$, $S_5$, $S_6$, $S_7$, $S_8$ and $S_9$ shown in FIG. 21 are entered from an input device, not shown. The first intermediate layer 42 is constituted by four cells $H_1$, $H_2$, $H_3$ and $H_4$ connected to the cells $I_1$ to $I_9$ of the input layer 41. The second intermediate layer 43 is constituted by a sole cell $H_0$ connected to the cells $H_1$ to $H_4$ of the first intermediate layer 42. The output layer 44 is constituted by a sole cell 0 connected to the cell $H_0$ of the second intermediate layer 43 and is adapted to supply its output data $O_0$ to an output device, not shown.

Figure 22:
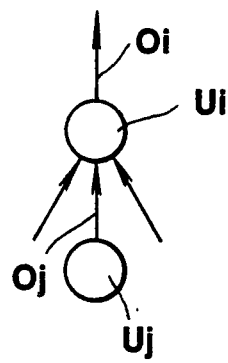
FIG. 22 is a diagrammatic view for illustrating the operation of picture transformation by the apparatus shown in FIG. 20.

The cells $I_1$ to $I_9$, $H_1$ to $H_4$, $H_0$ and O of the layers 41, 42, 43 and 44 making up the four-layered neural network structure each perform signal processing corresponding to that of a neuron. As shown schematically in FIG. 22, an output $O_j$ of a cell $U_j$ connected to a cell $U_i$ by a coupling or weighting coefficient $W_{ij}$ is multiplied by the coupling coefficient $W_{ij}$ to give a product $W_{ij}O_j$ which is fed to the cell $U_i$ as an input. A plurality of such inputs $W_{ij}O_j$ are summed together to give $\Sigma W_{ij}O_j$ which is transformed by a predetermined activating function f, such as a sigmoid function, to give a value $O_i$ $$O_i = \frac{1}{-\sum_j W_{ij} \cdot O_j + \theta_i} \qquad (11)$$

which is output form the cell $U_i$.

The coupling or weighting coefficients of the link from cells $I_1$ to $I_9$ of the input layer to the cells $H_1$ to $H_4$ of the first intermediate layer 42 correspond to edge detection operators for detecting the edges of the central pixel $S_5$ of the array of 3×3 pixels in the horizontal direction (+x, −x) and in the vertical direction (+y, −y), that is, the coefficients of the template. The four cells $H_1$, $H_2$, $H_3$ and $H_4$ of the first intermediate layer 42 detect the edge components in the +x, −x, +y and −y directions from each net input. When the above formula (11) is expressed by formula (12)

$$O_i = \frac{1}{1 + e^{-net+\theta}} \qquad (12)$$

while each of the cells $H_1$ and $H_2$ of the first intermediate layer 42 receives edge detection amounts in the +x and −x directions as input and has the same threshold value $\theta$, the sum $O_x$ of the outputs $Oh_1$, $Oh_2$ thereof is given by the following formula (13)

$$O_x = O_{h1} + O_{h2} \qquad (13)$$
$$= \frac{1}{1 + e^{-net+\theta}} + \frac{1}{1 + e^{net+\theta}}$$

This formula (13) represents an even function and may be expanded by Taylor expansion into the formula (14)

$$O_x a_{0(\theta)} + a_{2(\theta)}net^2 + a_{4(\theta)}net^4 + \qquad (14)$$

such that, by setting the threshold value $\theta$ so that $a_{4(74)}=0$, the formula may be approximated to a quadratic equation.

By setting each threshold value $\theta$, each of the cells $H_1$ and $H_2$ of the first intermediate layer 42 supplies to the cell $H_0$ of the second intermediate layer 43 the outputs $O_{h1}$ and $O_{h2}$ that are approximate to the square of the edge component in the x direction, as indicated by the formula (13).

Similarly, when each of the $H_3$ and $H_4$ of the first intermediate layer 42 receives the amounts of edge detection in the +y and −y directions as inputs, and each threshold value is set correspondingly, the sum of the outputs $O_{h3}$, $O_{h4}$ approximate to the square of the edge components in the y direction $$O_y = O_{h3} + O_{h4} \qquad (15)$$

is supplied to the cell $H_0$ of the second intermediate layer 43.

That is, the cells $H_1$ to $H_4$ making up the first intermediate layer 42 operate for performing a processing operation equivalent to that of the edge detection circuit 3 in the preceding first embodiment.

Also, in this third embodiment, the cell $H_0$ of the second intermediate layer 43 operates for performing a histogram averaging operation equivalent to that of the averaging circuit 4 of the first embodiment, when the threshold value of the cell $H_0$ is set appropriately. In addition, the cell 0 of the output layer 44 has its coupling coefficient and threshold value so set that the cell operates as an inverting function equivalent in operation to the inverting circuit 5 in the first embodiment.

In this picture data processing apparatus 40, the input picture data $D_{IN}$, produced upon scanning the picture represented by picture data produced in the input device, with the 3×3 array of the pixels $S_1$ to $S_9$ as one unit, are fed to the input layer 41, in such a manner that picture output data, subjected to the line picture forming operation similar to that performed by the picture data processing apparatus 1 of the above described first embodiment, are produced as the output $O_0$ of the cell O of the output layer 44.

The picture processing device of the present invention is provided with the above described edge detection circuit and averaging circuit whereby there may be formed picture data of a line picture in which the features of the line of the picture represented by the input picture data have been grasped satisfactorily. Therefore, with the use of the picture data processing apparatus of the present invention, line pictures may be formed with time and labor consumption markedly less than in the case of manual operation.

Further, in accordance with the picture processing apparatus of the present invention, data of a picture with bright color, such as those of a crayon picture or an oil painting, may be produced. Therefore, with the use of the picture processing apparatus of the present invention, line pictures may be produced also with less time and labor consumption.

In addition, the picture processing apparatus according to the present invention may be implemented by a high-speed microprocessor or dedicated hardware to provide for substantially real time processing of the input picture data to facilitate formulation of animated pictures.

Figure 23:
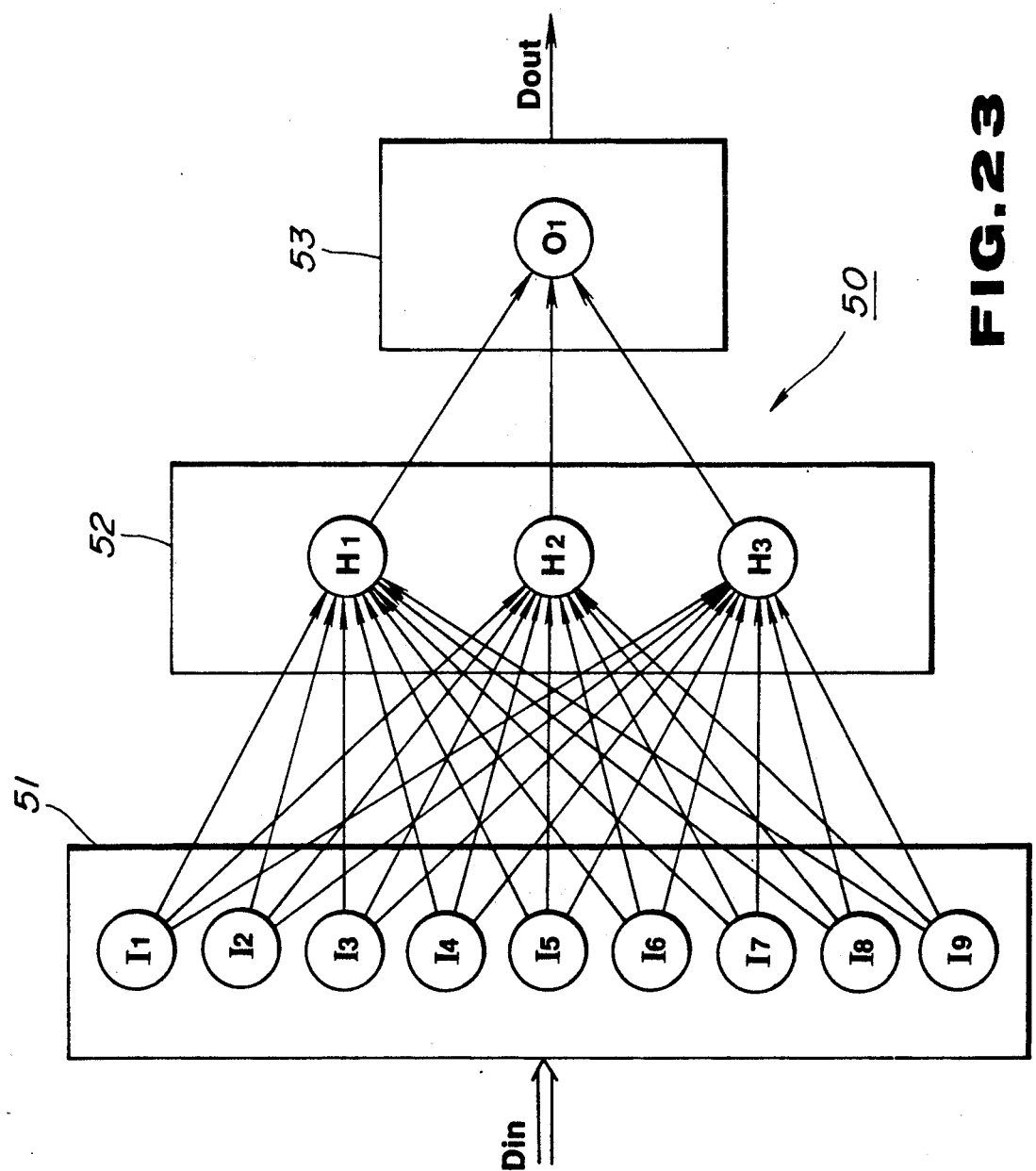
FIG. 23 is a block diagram showing still another embodiment of the picture processing apparatus of the present invention.

A modified embodiment of the present invention will be hereinafter explained in which a learning processing section 60 is annexed as shown in FIG. 24 to a signal processing section 50 comprised of an input layer 51, an intermediate layer 52 and an output layer 53, as shown in FIG. 23, so that the data are subjected in advance to a learning processing operation and the desired picture conversion or transformation is performed in the signal processing section 50.

Research and development are presently being conducted on signal processing system with the use of a neural network for performing signal processing corresponding to that of a neuron. For example, a back propagation learning rule may be applied as a learning algorithm to a multi-layered neural network having an intermediate layer between the input layer and the output layer, as a tentative application to a variety of signal processing modes, such as high-speed picture processing or pattern recognition. For an explanation of the "back propagation learning rule", see for example "Parallel Distributed Processing, vol. 1, the MIT Press, 1986, or Nikkei Electronics, Aug. 10 issue, 1987, No. 427, pp 115-124.

Figure 25:
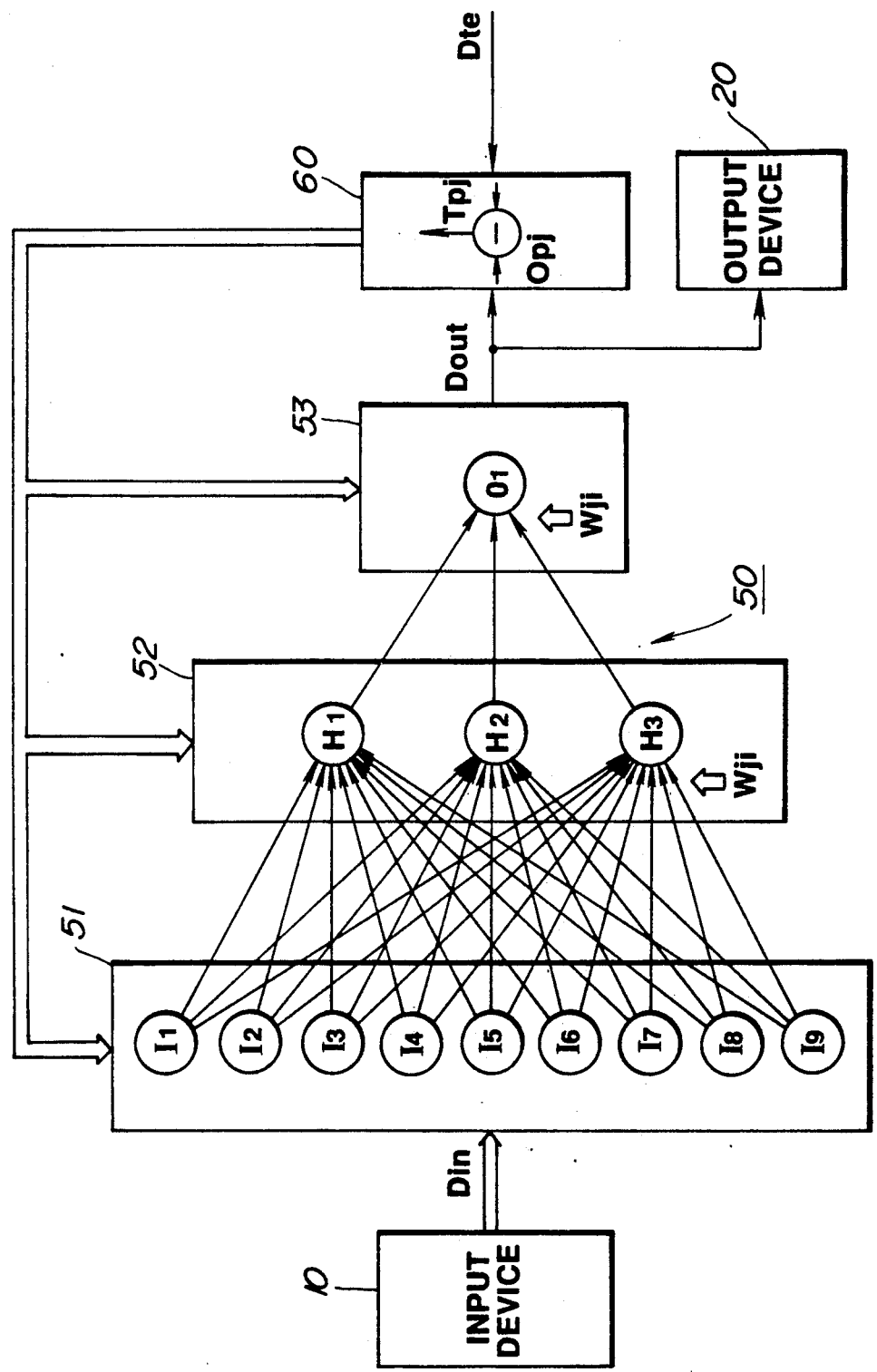

According to the present invention, the coupling coefficient or the weighting coefficient $W_{ji}$ is determined by applying the above mentioned back propagation learning rule to the neural network shown in FIG. 25, and the picture converting operation of converting the input picture data into a line picture is performed with the use of the neural network in which the coupling or weighting coefficient $W_{ji}$ has been set in advance.

Each of the cells $I_1, I_2, I_3, I_4, I_5, I_6, I_7, I_8, I_9, H_1, H_2, H_3$ and $O_1$, making up the neural neural network shown in FIG. 25, performs signal processing corresponding to that of a neuron. The signal output from each cell of the input layer 51 is multiplied by a coupling coefficient (weighting coefficient) $W_{ji}$ before being applied to each cell of the intermediate layer 52. Similarly, the signal output from each cell of the intermediate layer 51 is multiplied by a coupling coefficient (weighting coefficient) $W_{ji}$ before being applied to the cell of the output layer 53. Each cell of the intermediate layer 52 outputs a value $O_j$ which represents the sum of a plurality of signals comprised of output signals of the cells of the input layer 51 multiplied respectively by coupling coefficients (weighting coefficients) $W_{ji}$, and subsequently transformed by a predetermined function f, such as a Sigmoid function. The cell of the output layer 53 outputs a value $O_j$ which represents the sum of a plurality of signals comprised of output signals of the cells of the intermediate layer 52, multiplied respectively by coupling coefficients (weighting coefficients) $W_{ji}$, and subsequently transformed by a predetermined function f, such as a Sigmoid function.

That is, when a value of a pattern p is supplied as an input value to each cell of the input layer 51, the output value $O_{pj}$ of each cell of the intermediate layer and the output layer is expressed by $$O_{pj} = f_j(net_{pj}) \qquad (16)$$
$$= f_j\left(\sum_i W_{ji} \cdot O_{pji}\right)$$

The output value $O_{pj}$ of the cell of the output layer 53 is found by sequentially computing the output values of the cells corresponding to the neurons from the input layer 51 towards the output layer 53.

In the back propagation learning algorithm, an output value $O_{pj}$ closest to a teacher signal $t_{pj}$ may be output from the cell $O_1$ of the output layer 53, by sequentially performing, from the output layer 53 towards the input layer 51, the learning procedure of changing the coupling coefficients (weighting coefficients) $W_{ji}$ so as to minimize the sum $$E_p = \frac{1}{2} \sum_i (t_{pj} - O_{pj})^2 \qquad (17)$$

of the square errors between the output values $O_{pj}$ and the desired output value $t_{pj}$, wherein the output values $O_{pj}$ represent the actual output value of each cell of the output layer 53 when the pattern p is given to the input layer.

If a variation $\Delta W_{ji}$ of the coupling coefficients or weighting coefficients $W_{ji}$ which decreases the sum $E_p$ of the square errors is expressed as $$\Delta W_{ji} - E_p / W_{ji} \qquad (18)$$

the above formula (18) may be rewritten to $$\Delta W_{ji} = \eta \cdot \delta pj \, O_{pi} \qquad (19)$$

This process is stated in detail in the above reference material.

In the above formula, $\eta$ stands for the learning rate, which is a constant that may be empirically determined from the number of the units or layers or input or output values, and $\delta_{pj}$ stands for errors proper to the cells.

Therefore, for determining the variation $\Delta W_{ji}$, it suffices to find the values of the errors $\delta_{pj}$ in the reverse direction, i.e. from the output layer towards the input layer of the network. The error $\delta_{pj}$ of the cell of the output layer is given by $$\delta_{pj} = (t_{pj} - O_{pj}) f'_j(net_j) \qquad (20)$$

while the error $\delta_{pg}$ of the cell of the intermediate layer may be computed by a recurrent function $$\delta_{pj} = f'_j(net_j) \sum_k \delta_{pk} W_{kj} \, . \qquad (21)$$

using the error $\delta_{pk}$ and the coupling coefficient $W_{kj}$ of each cell to which the cell of the intermediate layer is connected, herein each unit of the output layer. This process of finding the formulas (20) and (21) is also explained in detail in the above mentioned reference material.

Meanwhile, $f'_j(net_j)$ in the above formula represents a differentiation of the output function $f_j(net_j)$.

The variation $\Delta W_{ji}$ may be found by the above formula (19) using the results of the above formulas (20)

and (21). However, more stable results may be obtained from the following formula (22)

$$\Delta W_{ji(n+1)} = \eta \cdot \delta_{pj} O_{pi} + \alpha \cdot \Delta W_{ji}(n) \quad (22)$$

with the use of the results of the preceding learning. In the above formula, $\alpha$ stands for a stabilization constant for reducing the error oscillations and accelerating the convergence process.

This learning is performed repeatedly and terminated at the time point when the sum $E_p$ of the square errors between the output values $O_{pj}$ and the value of the teacher signals $t_{pj}$ has become sufficiently small.

Referring to FIGS. 24 and 25, there is shown a picture transformation apparatus according to a fourth embodiment of the present invention, wherein the learning operation in accordance with the rule of back propagation is applied to a signal processor 50 constituted by a three-layered neural structure. Based on the error information between a teacher signal $D_{te}$, which is the picture data for a small region of an original picture subjected to a predetermined picture transformation, and an output signal $D_{out}$ obtained from the output layer 53 after transformation of the original picture by the neural network, a learning section 60 applies a learning operation to the signal processing section 50 consisting of sequentially changing the coefficient indicating the strength of coupling between the cells, or weighting coefficient $W_{ji}$, from the output layer 53 towards the input layer 51, so as to minimize the square errors.

For example, a person is photographed as an original picture by a video camera and the output corresponding to each of its pixels is digitized and stored in a memory, not shown, as the digital picture data. On the other hand, as a picture which is the above mentioned original picture subjected to a predetermined picture transformation, a sketch of a person is photographed by a video camera, and the output corresponding to each of its pixels is digitized and stored in a memory, not shown. A learning operation is then applied to the signal processing section 50 for transforming the original picture, that is, the photographed picture of the person, into the picture of the sketch, for each small-picture region consisting of an array of 3×3 pixels as a unit.

For example, as shown in FIG. 26A, picture data $A_1$ to $A_9$ of the array of 3×3 pixels in a small picture region of the original picture indicating a feature A are supplied as input picture data for learning operation $D_{in}$ to nine cells $I_1$ to $I_9$ of the input layer 51 of the signal processing section 50. On the other hand, picture data $A_0$ of a center pixel of 3×3 pixels, representing the transformed data for the input picture data for learning operation $D_{in}$, are supplied as the teacher signal $D_{te}$ to the learning section 60. Based on the error data between the teacher signal $D_{te}$ and the output signal $D_{out}$ from the cell $O_1$ of the output layer 53, the learning section 60 applies a learning operation to the signal processing section 50 consisting in learning the coefficient indicating the coupling strength between the cells, that is, the weighting coefficient $W_{ji}$, from the output layer 53 towards the input layer 51. After completion of the learning operation with respect to the picture data $A_1$ to $A_9$ for the 3×3 pixels indicating the feature A, picture data $B_1$ to $B_9$ for 3×3 pixels, indicating another feature B in the sketch transforming operation, are supplied to the cells $I_1$ to $I_9$ of the input layer 51 as the input picture data for learning processing $D_{in}$, while picture data $B_0$ of the center pixel of the 3×3 pixels, representing the transformed data for the input picture data for learning processing $D_{in}$, are supplied to the learning processing section 60 as teacher signal $D_{te}$. Based on the error data between the output signal $D_{out}$ from the cell $O_1$ of the output layer 53 and the teacher signal $D_{te}$, the learning processing section 60 subjects the signal processing section 50 to a learning operation of learning the coupling strength between the cells or weighting coefficient $W_{ji}$ from the output layer 53 towards the input layer 51. In a similar manner, a learning processing section 60 subjects the signal processing section 50 to learning concerning picture data of small areas of 3×3 pixels indicative of various features in the sketch transforming operation.

In the signal processing section 50, to which the above described learning processing has been applied, the picture data of the original picture are fed to the cells $I_1$ to $I_9$ of the input layer 51 of the signal processing section 50, by small-area picture data of 3×3 pixels at a time, and the picture data which have been transformed with respect to all of the pixels are obtained as the transformed output signals $D_{OUT}$ from the cell $O_1$ of the output layer 53. In this manner, there may be obtained picture data, in which the sketch transforming operation of transforming the original picture, that is, the photographed picture of a person, into the sketch picture, has been completed.

In the signal processing section 50, where the learning processing has been performed, a data template for sketch picture transformation is formed by the above described learning processing, as the coefficients indicative of the coupling strength between the cells, that is, weighting coefficients $W_{ji}$. Even when the picture input data $D_{in}$ indicative of an arbitrary picture other than the original picture is fed to the cell $I_1$ to $I_9$ of the input layer 51 of the signal processing section 50, by scanning small-area picture data of 3×3 pixels at a time, the output picture data $D_{OUT}$ that have undergone a sketch picture transforming operation with respect to all pixels may be obtained as the output signal from the cell $O_1$ of the output layer 53.

The present invention is not limited to the above described embodiment and, as the specified picture transforming operation of the original picture, various picture transforming operations, such as white-black inversion, filtering, line thinning or contour extraction, may be performed in addition to the sketch picture transforming operation, by forming the data template for picture transformation by the above mentioned learning operation.

A learning algorithm other than the back-propagation learning rule may also be adopted to apply the learning processing to the learning processing section 50.

After completion of the learning processing for the signal processing section 50, the input picture signals entered from the input device 10 into the input layer 51 are entered to the output device 20 after having undergone a predetermined transformation as set by the learning, so as to be then displayed on a display device or recorded by a recording device.

Figure 27:
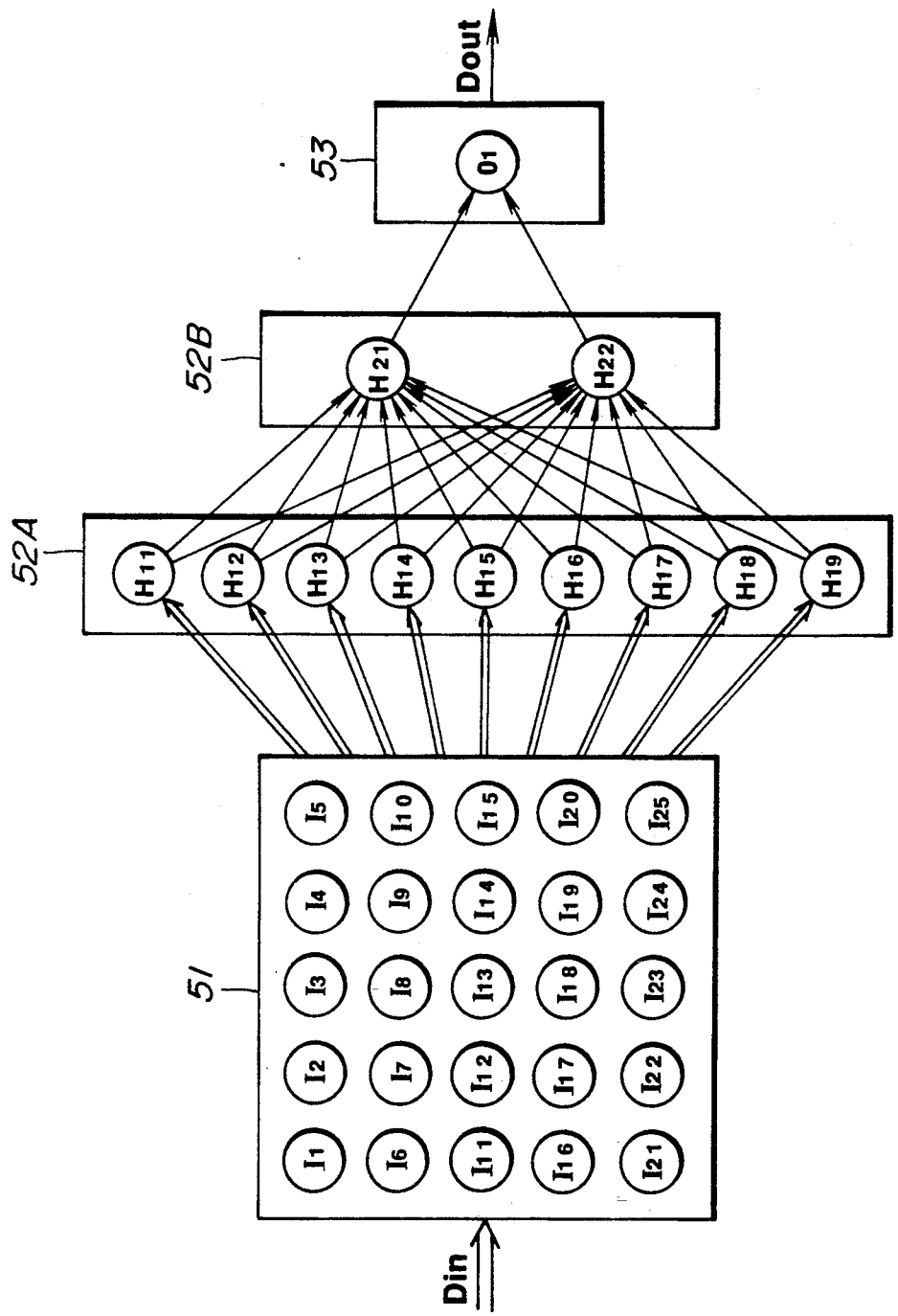
FIG. 27 is a block diagram showing a further embodiment of the picture processing apparatus of the present invention.

The picture transformation apparatus of the present invention may also employ a signal processing section constituted by a multi-layer neural network other than the three-layer neural network of the signal processing section 50 in the above described embodiment. For example, the signal processing section may be constituted by a four-layered neural network in which, as shown in FIG. 27, the input layer 51 is formed by 25 cells $I_1$ to $I_{25}$ to which input picture data $D_{IN}$ of 5×5 pixels are fed, the first intermediate layer 52A is formed by nine cells $H_{11}$ to $H_{19}$ coupled to the cells $I_1$ to $I_{25}$ of the input layer 51, the second intermediate layer 52B is formed by two cells $H_{21}$, $H_{22}$ coupled to the cells $H_{11}$ to $H_{19}$ of the first intermediate layer 52A and the output layer 53 is formed by one cell $O_1$.

The picture processing apparatus of the present invention is so arranged and constructed that a signal processing section having a learning function and made up of an input layer, an intermediate layer and an output layer, each constituted by plural cells which perform the signal processing comparable to that of a neuron, is subjected to a learning processing operation of learning the coefficient of coupling strength between the cells, with respect to the small-area picture data of the original picture entered to the input layer, on the basis of error signals between the output signal from the output layer and teacher signals, which teacher signals are small-area picture data of a picture obtained by subjecting an original picture to a predetermined picture transformation, in such a manner that any given picture input data are subjected to predetermined picture transformation processing in the signal processing section which has undergone the learning processing.

Therefore, in accordance with the present invention, any desired picture transforming function may be realized by applying desired picture data as the teacher signals at the time of learning processing of the signal processing section. Complicated picture transformation processing may be realized speedily by a simplified network by subjecting given picture input data to specific picture transformation processing, such as edge detection, averaging or inversion, at the signal processing section which has previously undergone learning processing.

We claim:

1. A picture processing apparatus for transforming an input picture into a line picture, the apparatus comprising:
   a) edge detection means receiving input picture data representing said input picture and detecting edges of an image included in said input picture and edge detection data corresponding thereto,
   b) converting means receiving said edge detection data from said edge detection means, said edge detection data representing said edges of the image, said converting means separately converting sad edge detection data by a transformation calculated from an entire histogram, derived from the whole image, of the frequency of said edge detection data versus the intensity of said edge detection data at the output thereof, said transformation causing as flatter intensity distribution of said edge detection data than at the input thereof, and
   c) means for displaying a line picture on the basis of converted edge detection data from said converting means wherein said detected edges are displayed with nearly equal visual intensity corresponding to the flatter histogram.

2. A picture processing apparatus for transforming an input picture into a line picture, the apparatus comprising:
   a) edge detection means receiving input picture data representing said input picture and detecting edges of an image included in said input picture and producing edge detection data corresponding thereto,
   b) converting means receiving said edge detection data from said edge detection means, said edge detection data representing said edges of the image, said converting means separately converting said edge detection data by a transformation calculated from an entire histogram, derived from the whole image, of the frequency of said edge detection data versus the intensity of said edge detection data at the output thereof, said transformation causing a flatter intensity distribution of said edge detection data than at the input thereof, and
   c) mixing means for adding color data signals corresponding to original colors of the image included in said input picture to said edge detection data from said converting means, and
   d) means for displaying a line picture on the basis of converted edge detection data and color data signals from said mixing means wherein said detected edges are displayed with nearly equal visual intensity corresponding to the flatter histogram.

3. A picture processing apparatus for transforming an input picture into a line picture, the apparatus comprising:
   a) edge detection means receiving input picture data representing said input picture and detecting the edges of an image included in said input picture and producing edge detection data corresponding thereto,
   b) first converting means receiving the edge detection data from said edge detection means, said edge detection data representing said edges of the image said first converting means separately converting said edge detection data by a transformation calculated from an entire histogram, derived from the whole image, of the frequency of said edge detection data versus the intensity of said edge detection data at the output thereof, said transformation causing a flatter intensity distribution of said edge detection data than at the input thereof,
   c) mixing means for adding color data signals corresponding to original colors of the image included in said input picture to said edge detection data from said first converting means and producing summed color data output signals therefrom,
   d) second converting means receiving output signals from said mixing means for converting said summed color data signals by a transformation calculated from a histogram, derived from the whole image, of the frequency of said summed color data versus the intensity of said summed color data signals, said transformation causing a flatter intensity distribution of said summed color data signals than at the input thereof, and
   e) means for displaying a color averaged line picture on the basis of converted summed color added signals from said second converting means wherein said detected edges are displayed with nearly equal visual intensity corresponding to the flatter histogram.

4. The picture processing apparatus according to claim 1, further comprising means for storing said converted edge detection data from said converting means.

5. The picture processing apparatus according to claim 2, further comprising means for storing said converted edge detection data and color data signals from said mixing means.

6. The picture processing apparatus according to claim 3, further comprising means for storing said converted, summed color data signals from said second converting means.

7. A picture processing apparatus according to claim 1 wherein said transformation is derived using mathematical integration.

8. A picture processing apparatus according to claim 1 wherein said transformation is a predetermined mathematical function.

* * * * *

UNITED STATES PATENT AND TRADEMARK OFFICE
CERTIFICATE OF CORRECTION

PATENT NO. : 5,101,440
DATED : March 31, 1992
INVENTOR(S) : Toshiro et al It is certified that error appears in the above-identified patent and that said Letters Patent is hereby corrected as shown below:

```
Col.1,  line 43, change "is" to --as--
Col.6,  line 14, change "step" to --at step--
        line 58, change "prenous" to --previous--
Col.7,  line 4,  change "kf" to --of--
Col.8,  line 26, change "S₁1" to --S₁=1--
Col.9,  line 40, insert --1+e--
        line 41, change "form" to --from--
        line 43, after "from" insert --the--
Col.10, line 5,  after "Ox" insert --=--
        line 7,  change "(74" to --(θ--
        line 52, after "circuit" second occurence,
    insert --,--
Col.11, line 15, after "on" insert --a--
Col.12, line 32, change "ΔWji - Ep/Wji" to--ΔWji oc -∂Ep/∂Wji
        line 53, change "∫pg" to --∫pj--
Col.14, line 9,  change "a" second occurence, to --the--

Col.15, line 49, change "sad" to --said--
        line 54, change "as" to--a--
```

Signed and Sealed this

Thirty-first Day of May, 1994

Attest:

BRUCE LEHMAN

*Attesting Officer*    Commissioner of Patents and Trademarks